(12) United States Patent
Odell (10) Patent No.: US 6,668,243 B1
(45) Date of Patent: Dec. 23, 2003

(54) NETWORK AND LANGUAGE MODELS FOR USE IN A SPEECH RECOGNITION SYSTEM

(75) Inventor: Julian J. Odell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/856,802

(22) PCT Filed: Nov. 16, 1999

(86) PCT No.: PCT/GB99/03812

§ 371 (c)(1),
(2), (4) Date: Aug. 2, 2001

(87) PCT Pub. No.: WO00/31725

PCT Pub. Date: Jun. 2, 2000

(30) Foreign Application Priority Data

Nov. 25, 1998 (EP) .............................................. 98309650

(51) Int. Cl.[7] .............................................. G10L 15/06
(52) U.S. Cl. ....................................... 704/243; 704/242
(58) Field of Search ................................ 704/231, 239, 704/240, 232, 242, 243, 244, 245, 251, 255, 256, 259

(56) References Cited

U.S. PATENT DOCUMENTS

| | | | | |
|---|---|---|---|---|
| 5,349,645 A | * | 9/1994 | Zhao | 704/256 |
| 5,392,363 A | | 2/1995 | Fujisaki et al. | 382/13 |
| 5,832,428 A | * | 11/1998 | Chow et al. | 704/254 |
| 5,983,180 A | * | 11/1999 | Robinson | 704/254 |
| 6,131,089 A | * | 10/2000 | Campbell et al. | 706/20 |
| 6,151,574 A | * | 11/2000 | Lee et al. | 706/256 |
| 6,173,076 B1 | * | 1/2001 | Shinoda | 382/226 |
| 6,230,128 B1 | * | 5/2001 | Smyth | 704/236 |

FOREIGN PATENT DOCUMENTS

| | | |
|---|---|---|
| EP | 0 238 692 | 9/1987 |
| EP | 0 720 147 A1 | 7/1996 |
| EP | 0 732 685 A2 | 9/1996 |

OTHER PUBLICATIONS

"Language–Model Look–Ahead for Large Vocabulary Speech Recognition," Fourth International Conference on Spoken Language Processing, vol. 4, pp. 2095–2098 (Oct. 3–6, 1996).

"A Comparison of Several Approximate Algorithms for Finding Multiple (N–BEST) Sentence Hypotheses," Speech Processing 1, Toronto, vol. 1, No. Conf. 16, pp. 701–704 (May 14–17, 1991).

"New Developments in the INRS Continuous Speech Recognition System," Fourth International Conference on Spoken Lanuage Processing, vol. 1, pp. 2–5 (Oct. 3–6, 1996).

* cited by examiner

*Primary Examiner*—Daniel Abebe
(74) *Attorney, Agent, or Firm*—Theodore M. Magee; Westman, Champlin & Kelly, P.A.

(57) ABSTRACT

A language model structure for use in a speech recognition system employs a tree-structured network model. The language model is structured such that identifiers associated with each word and contained therein are arranged such that each node of the network model with which the language model is associated spans a continuous range of identifiers. A method of transferring tokens through a tree-structured network in a speech recognition process is also provided.

11 Claims, 5 Drawing Sheets

```
\data\
ngram 1=5
ngram 2=6
ngram 3=2

\1-grams:
-1.3275      </s>
-99.990      <s>
-4.6878      APPLICATION          -0.6336
-4.7013      PATENT               -0.5932
-7.5000      ENTROPIC             -0.5672

\2-GRAMS:
-4.7730      <s></s>
-5.6668      <s>APPLICATION
-5.4180      <s>PATENT              -.02656
-1.0456      APPLICATION</s>
-1.3380      PATENT</s>
-1.8926      PATENT APPLICATION    -0.3456

\3-grams:
-0.0132      <s>PATENT APPLICATION
-2.0132      PATENT APPLICATION</s>
\end\

A    a b d g
B    a b d g
C    a b d h j        ⟵ Dictionary
D    a b e
E    a c f i
F    a c f
```

NETWORK AND LANGUAGE MODELS FOR USE IN A SPEECH RECOGNITION SYSTEM

The present application is a national stage application of and claims priority from PCT Application PCT/GB99/03812 filed Nov. 16, 1999 and published under PCT Article 21(2) in English.

This invention relates to speech recognition systems and, in particular, to network models, language models and search methods for use in such systems.

One technique which is widely used in speech recognition systems is based upon the representation of speech units using probabilistic models known as hidden Markov models (HMMs). An EHM consists of a set of states connected by transitions. The HMMs are used to model units in the speech recogniser system which are usually individual speech sounds, referred to as phones. By using individual HMMs, models for complete words can be formed by connecting together individual phone models according to pronunciation rules for the language being recognised.

Given a segment of speech and a set of HMMs that may correspond to the speech segment, the likelihood that each set of HMMs corresponds to the speech segment can be calculated. If this likelihood is calculated for all words in a language vocabulary, then the most probable word can be chosen. One technique for doing this likelihood assessment employs the well-known Viterbi algorithm.

One approach to tackling the above problem has been to form a network model in which each word in a vocabulary is represented by a path through the model. Since the composite model is also an HMM, the most likely path, and hence the word, can be computed using the Viterbi algorithm. Such a model for single word recognition can be extended to the case of sentences by allowing connections from the end of words to the start of other words. So that language model probabilities, which are based upon the likelihood of one word being adjacent to another, can also be considered in such models, probabilities for each inter-word connections are also provided in such models.

Such network models can work well, but are often large and in order for them to be employed in real time require considerable processing power. Furthermore, such models which only use a single HMM for each phone are often not particularly accurate. Accuracy can be improved by considering not only the identity of the phone the model represents but also the identity of the preceding and the following phone when determining the appropriate HMM parameters. Such an approach is often called a triphone approach. However, if the phonetic context is considered across word boundaries this approach increases the network complexity considerably. At word boundaries such a system requires that for each different cross-word boundary context a different HMM is used for the first and last phone of each word. This leads to considerable increase in network size and hence high computational requirements on the system employing such a model.

A number of approaches have been proposed in attempts to employ triphone models without excessive computational for those requirements. However, these approaches typically use approximate models and/or operate multiple passes through a network, reducing accuracy and/or increasing processing time.

As mentioned above, speech recognition systems usually require the calculation of likelihoods which must be computed to compare individual word hypotheses and determine the most likely word. If such a system employs word context as an assessment criteria, this usually means that such likelihoods are composed of two parts, the acoustic model likelihood (dependent upon the detected sound) and a language model probability. This language probability is normally determined from a reference language model which forms part of the speech recognition system, with the language model being accessed from the system network model as the network model is passed through during speech recognition. Given the large vocabulary and high complexity of typical languages an accurate statistical model of general word sequences can be very large. The time taken to access this language model whilst carrying out the recognition process can be considerable, affecting significantly the system's ability to operate in real time, and the overall data processing requirement demands of the system.

SUMMARY OF INVENTION

The present invention seeks to provide a network model which can use such cross word context dependent triphone HMMs yet which over comes the above and other problems.

The present invention seeks to provide a language model structure which stores all the necessary language model data, yet which is capable of being accessed quickly and efficiently.

According to a first aspect of the present invention, we provide, a language model structure for use in a speech recognition system employing a tree-structured network model, the language model being structured such that identifiers associated with each word and contained therein are arranged such that each node of the network model with which the language model is associated spans a continuous range of identifiers According to a second aspect of the present invention, we provide, a tree-structured network for use in a speech recognition system, the tree-structured network comprising:
 a first tree-structured section representing the first phone of each word having two or more phones;
 a second tree-structured section representing within word phones, wherein within word phones includes any phone between the first phone and the last phone of a word;
 a third tree-structured section representing the last or only phone of each word;
 a fourth tree-structured section representing inter-word silences; and,
 a number of null nodes for joining each tree-structured section to the following tree-structured section.

Each tree structured section is joined to the next by a set of null nodes. These reduce the total number of links required and in the layer before the final phone model of each word also mark the point at which the token history is updated to indicate the recognised word.

According to a third aspect of the present invention, we provide, a method of transferring tokens through a tree-structured network in a speech recognition process, each token including a likelihood which indicates the probability of a respective path through the network representing a respective word to be recognised, and wherein each token further includes a history of previously recognised words, the method comprising:
 i) combining tokens at each state of the network to form a set of tokens, the set including a main token having the highest likelihood and one or more relative tokens;
 ii) for each set of tokens, merging tokens having the same history;
 iii) transferring the set of tokens to subsequent nodes in the network;

iv) updating the likelihood of at least the main token of each set of tokens; and, v) repeating steps i) to iv) at each respective node.

Thus the present invention allows the tokens to be combined and then handled as sets of tokens. This helps reduce the amount of processing required to transfer the tokens through the tree-structured network.

According to a fourth aspect of the present invention, we provide, a method of merging sets of tokens in a speech recognition process, each token including a likelihood which indicates the probability of a respective path through the network representing a respective word to be recognised, and wherein each token further includes a history of previously recognised words, the method comprising:

i) assigning an identifier to each set of tokens, the identifier representing the word histories of each of the tokens in the set of tokens;

ii) comparing the identifiers of different sets of tokens; and, iii) merging sets of tokens having the same identifiers.

The present invention allows identifiers to be assigned to sets of tokens, based on the histories of the tokens within the set. This allows different sets of tokens to be compared without requiring the comparison of the history of each token within each set, thereby reducing the level of computation required.

BRIEF DESCRIPTION OF THE DRAWINGS

An example of the present invention will now be defined with reference to the accompanying drawings, in which.

DETAILED DESCRIPTION OF ILLUSTRATIVE EMBODIMENTS

Figure 1:
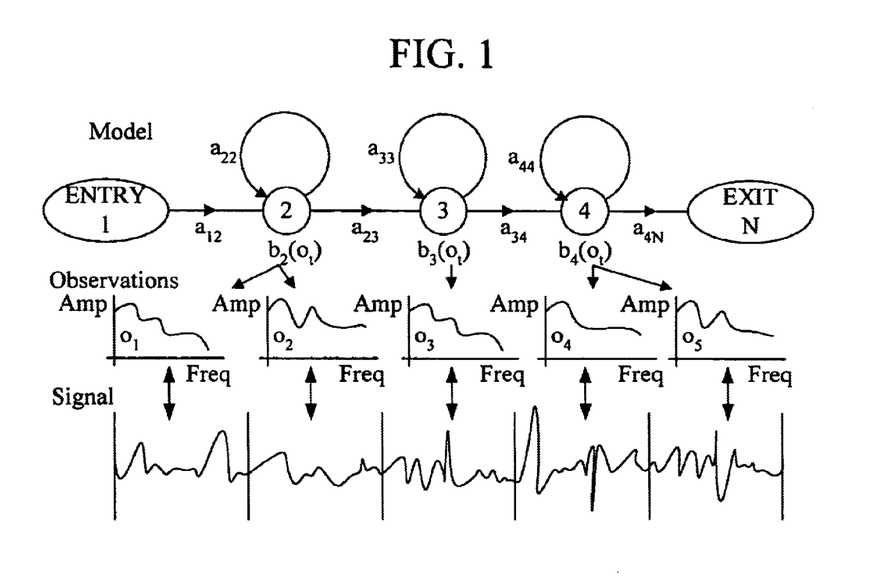
FIG. 1 is a schematic diagram showing an example HMM.

Referring to FIG. 1 the relationships between a received signal, observations based thereon, and an HMM network is shown. Its structure is similar to that described in the introduction above, with an entry node 1 and exit node n, with states 2 . . . 4 in between that, as a group, may represent a single phone or phones.

Figure 2:
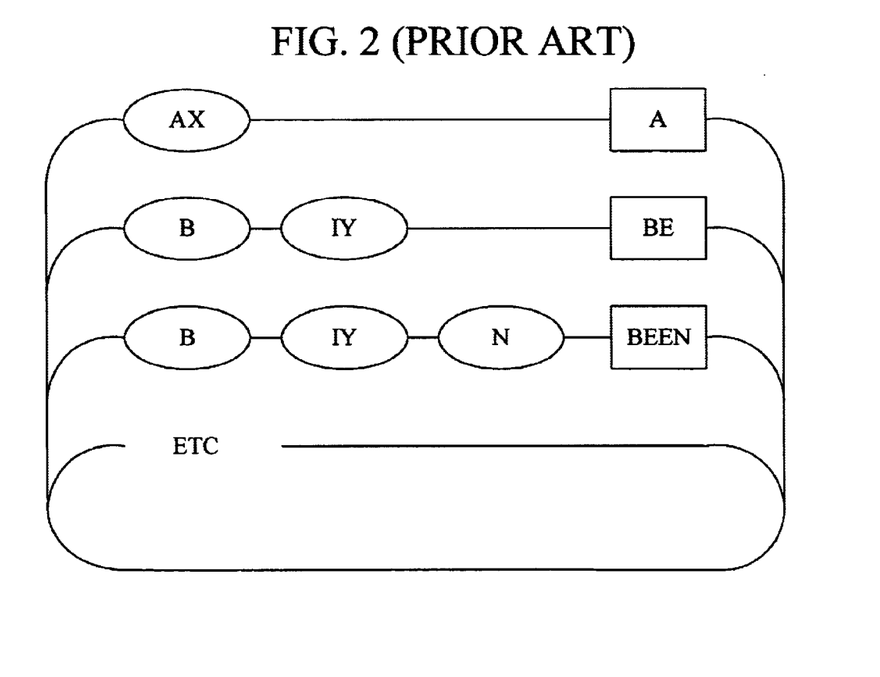
FIG. 2 is a schematic diagram showing a prior art network model employing HMMs.

FIG. 2 shows how a simple prior art network model is constructed from individual HMMs to produce individual words. Included in the network are word end nodes 10 indicating that a word has been recognised.

Figure 3:
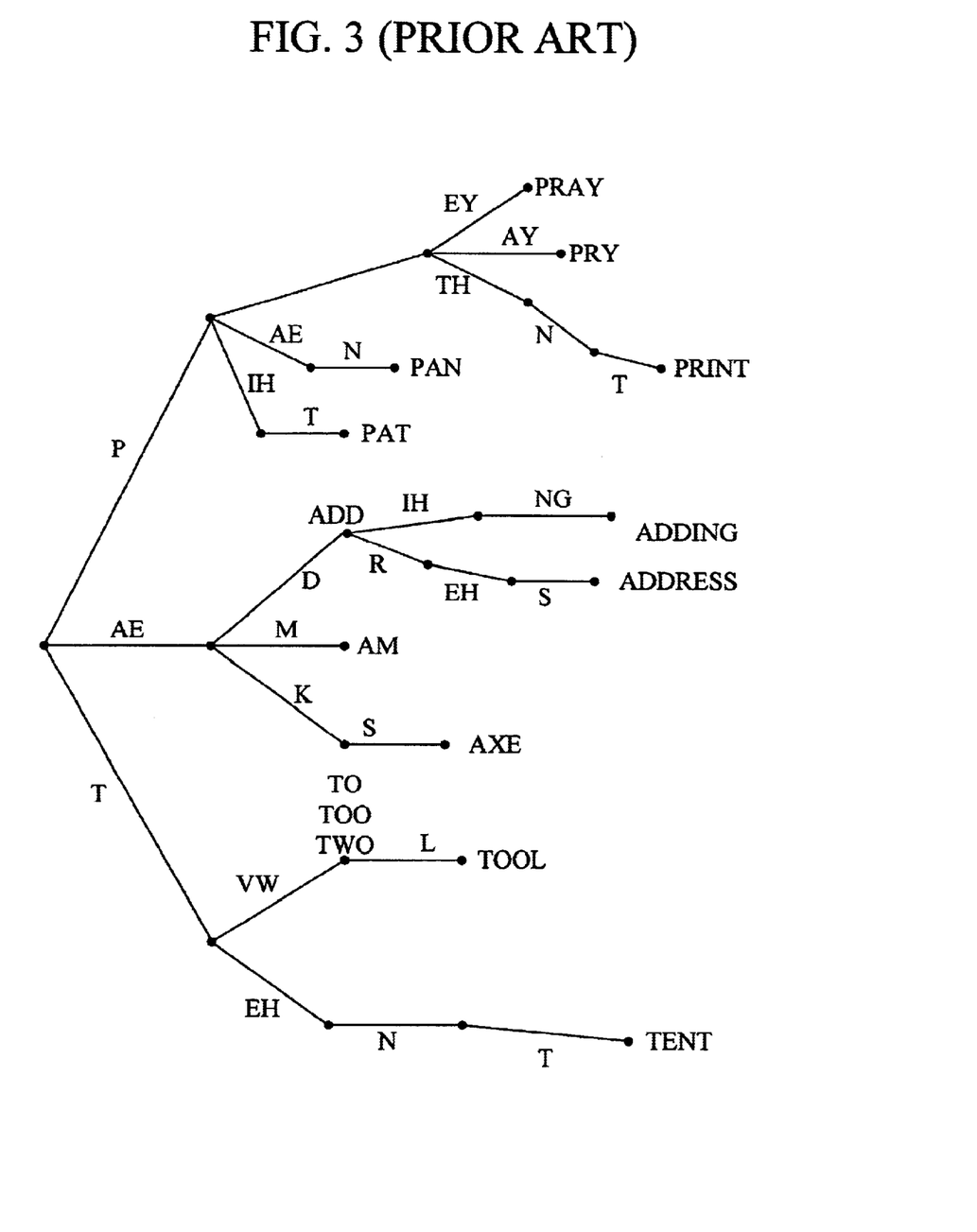
FIG. 3 is a schematic diagram showing a known tree structured network.

FIG. 3 shows a known tree structured network described in U.S. Pat. No. 5,621,859. In this model, within word triphone models are employed and a single tree used with approximate language model probabilities. With such an arrangement the exact language model (for a bigram) is unknown until the end of the word has been reached and depends upon the previous word. With such an arrangement it is possible to approximate within-word triphone nodes to reduce the computation required and forward searching can be complimented by backward searching which uses information from the forward pass and or/ acoustic models and/or language model. It has generally been considered, as this patent states, however, that full right and left context dependency is not possible with such a structure as it would create excessive branching and an exceptionally large network.

Figure 4:
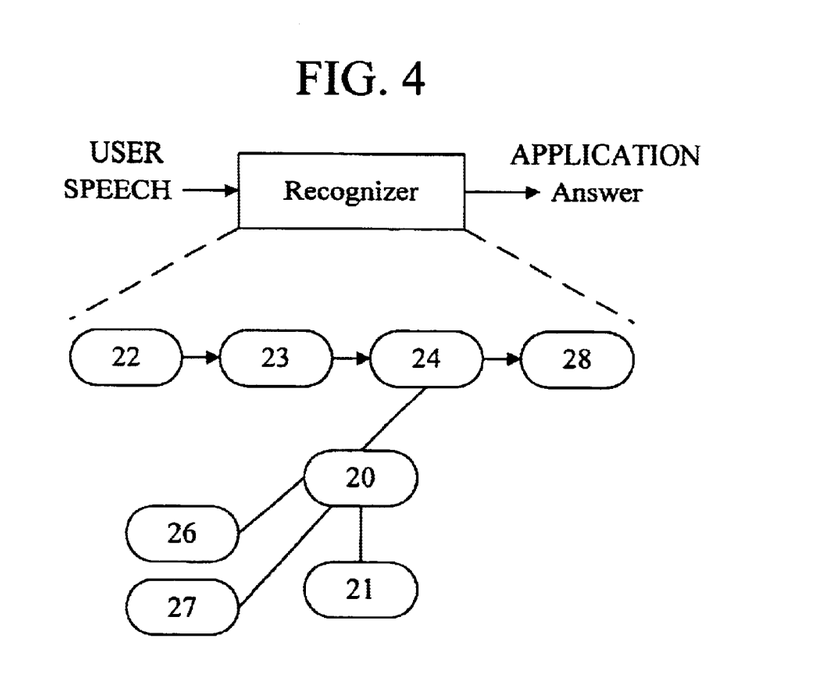
FIG. 4 is a block diagram of a speech recognition system employing the present invention.

FIG. 4 shows an example speech recognition system, with its key components, which can employ the network model 20 and language model 21 of the invention. The speech recognition system has means 22 for acquiring speech data and means 23 for encoding it. A recogniser 24 takes the encoded data and applies it, to the network model 20, which has access to a pronunciation dictionary 26, HMM information 27, and a language model 21. An answer 28 is then provided via a recogniser 24.

A network model 20 to represent all the words in the vocabulary is constructed that explicitly encodes the context-dependency of the acoustic models. This network includes connections from the end of each vocabulary word to the start of all legal following words (often all vocabulary words). The network model 20 is divided into three separate regions which are, where possible, tree-structured to share computation and are suitably connected to ensure that the context-dependent constraints are enforced. It should be noted that the language model probabilities are not encoded in the network and a particular point in the network model 20 can form part of many words. Furthermore only at certain points in the network model 20 is the identity of the current word uniquely resolved.

The static network model 20 is built prior to decoding utterances and encodes information about the vocabulary items independent of language model information. The search procedure used in the decoder uses a modified time synchronous Viterbi algorithm with various pruning mechanisms to discard paths in the network for which the score (or likelihood) falls below a threshold. A path is a structure that holds information (the acoustic score, language model score and word history) to a particular point in the network. As each frame of speech is processed the paths are extended to connecting states. The network itself describes how paths can be extended. Since at any point in the network model 20 the word identity is in general unknown and for each possible word there can be multiple previous word sequences, it is necessary to stored information about the various paths that can end at the same point in the network at a particular point in time. The head of these paths is encoded in a "token" structure which encodes the acoustic score to that point in the network up to the current time instant, the language model score and a pointer to previous words. These tokens are stored in the HMM state instance associated with active HMM. As the search proceeds new states are activated and token structures and other path-related information is created as needed.

Since the identity of the current word at an arbitrary point in the network model 20 is in general unknown, the language model probability that is applied to a path at any instant corresponds to the highest probability possible given the set of words for which the current network node forms part and the word history associated with the path. This language model probability can be refined as the search approaches the word end points in the network model, at which point the word identity is fully resolved. As a consequence of this continual refinement the language model probabilities are used frequently in the search procedure and hence a cache is preferably used so that language model probability access can be performed efficiently. Furthermore an efficient language model structure to enable retrieval of language model probabilities in a tree-ordered structure forms a further aspect of the invention, and is described below.

The network structure will now be described.

The network model 20 is represented by a set of nodes and each node has an associated set of links which specifies the set of nodes which follow it in the network. Unlike many simple static networks there is no need to encode language model probabilities within the links as the language model is applied dynamically depending upon token histories.

In addition to unique initial and final nodes there are three types of nodes which occur in the network.

HMM nodes. These represent instances of particular HMMs. In addition to entry and exit states these contain instances of emitting HMM states at which token likelihoods are updated to reflect the likelihood of the associated state generating the acoustic observation.

Word-end nodes. These represent the points at which word identity becomes unique and are the points at which token history information is updated and token merging prior to the following word takes place. These nodes do not necessarily occur after the last phone of the word.

Null nodes. To minimise the number of links required between fully connected nodes, null nodes are added to the network. The addition of these collation points simplifies parts of the network which would otherwise require a large cross-bar of links.

For the rest of this discussion a general word is assumed to consist of a sequence of phones, eg:

WORD a b c . . . x y z

The symbol a refers to a particular first phone which will be associated with a node of type A. Similarly the last phone of a word is z and the node associated with it as Z. In addition to these HMM nodes there are null nodes which occur between phones, together with word end nodes WE which are the points at which the token history is updated to reflect the recognition of WORD. The null nodes are identified by the two letters representing the position, ie. AB null nodes occur between the first and second phone models with ab representing a specific occurrence.

The recogniser uses context dependent triphone models in order to capture the coarticulation effects between adjacent phones and thereby improve performance. This produces more accurate models at the expense of increased HMM set size and a more complex recognition task.

In the following description, a triphone HMM for phone q preceded by phone p and followed by r will be referred to as p−q+r. However, it should be noted that although a separate logical triphone exists for each triphone context there are actually fewer distinct physical models due to sharing of parameters. In fact although there will be many tens of thousands of triphone contexts in a typical system the number of distinct HMMs is normally an order of magnitude smaller. In some of the diagrams this will be indicated by using the phone name followed by a number to indicate a model that may be shared in several different contexts.

Figure 5A:
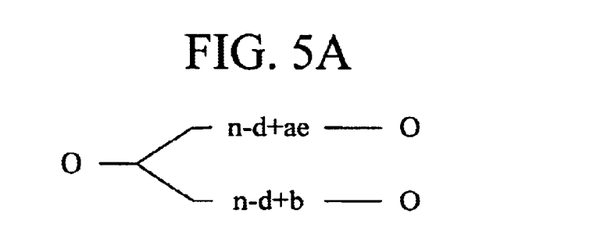
FIGS. 5A, 5B and 5C are diagrams showing network fragments employed in a network model according to the present invention.
Figure 5B:
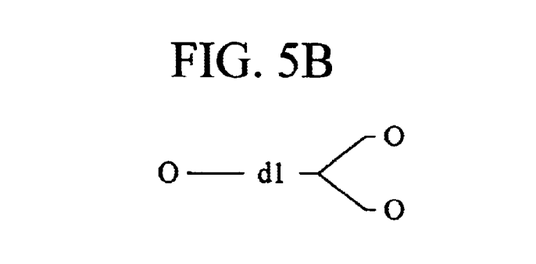

For example a fragment of the network with the structure of FIG. 5*a* can be replaced with that of FIG. 5*b* if the model d1 was the one used for both triphones n−d+ae and n−d+b.

As a consequence of the use of triphone models, the example word above is represented by a sequence of logical triphone models:

WORD ?−a+b a−b+c b−c+d . . . w−x+y x−y+z y−z+?

It should be noted that when cross word context dependent models are used the identity of the model used for the first (and last) phone of the word is unknown until the identity of the previous (and next) word is known. Once the actual sequence of logical triphones is known, the sequence of actual modes needed to represent it can be found, eg WORD a9 b36 c4 x8 y47 z30

In addition to basic triphone speech models this embodiment of the invention uses two context independent models for "silence". These are acoustic models encoding all of the various non-speech events and background noise that the recogniser should not transcribe as speech. A short pause, "sp", model is used in the periods where the speaker pauses briefly between words and the coarticulation effects of the previous phone are still present despite the pause. Such "sp" models are described as context free since they have no effect on context expansion.

Longer pauses can use a different silence model called "sil". This is used when the coarticulation effects are due not to the adjacent phone models but are due to the silence model. When expanding context "sil" models can be treated as any other phone apart from the fact that a context independent model is used for silence (with triphone models used for the actual phones). For example the phone sequence:

sil a b c sp d e sil f g h sil would be expanded into the logical triphone sequence:

sil sil−a+b a−b+c b−c+d sp c−d+e d−e+sil sil sil−f+g f−g+h g−h+sil sil

In order to efficiently cope with cross word context dependent triphone acoustic HMMS the network model 20 is preferably built in four parts/stages. The core of the network model 20 is a simple left-to-right tree structured set of nodes representing phones 2 to (N−1) of all words in the vocabulary which have more than two phones. Each of these paths ends in a specific word end node which represents that point at which sharing stops and word identity becomes unique.

The first and last phone of the words are treated separately (as are words consisting of only one or two phones). All possible first phone models (the identity of which also depends on the last phone of the previous word) are arranged in their own separate section of the network. A network section is built for the last phone models (which depend upon the following word).

Finally the shared last phone network is linked to the shared first phone network with a network of inter-word silence models.

Interconnecting these three networks are four sets of null nodes which serve as collation points. As mentioned above, these are identified by the position they appear in the network: AB nodes occur between the first and second phone of the word, YZ nodes occur between the last two phones, ZS nodes occur between the last phone of the word and the inter-word silence and finally SA nodes occur between the inter-word silence and the first phone of the next word.

Thus, in general, each word has the following representation in the network.

SA a AB b . . . y WE YZ z ZS s SA

With this structure it is obviously necessary to treat words which contain only a single phone, or just two phones differently. For two phone words the tree structured core of the network needs to be bypassed whilst special provision is needed to cope with single phone words (which are replicated for different contexts and incorporated into the final phone layer of the network).

Figure 5C:
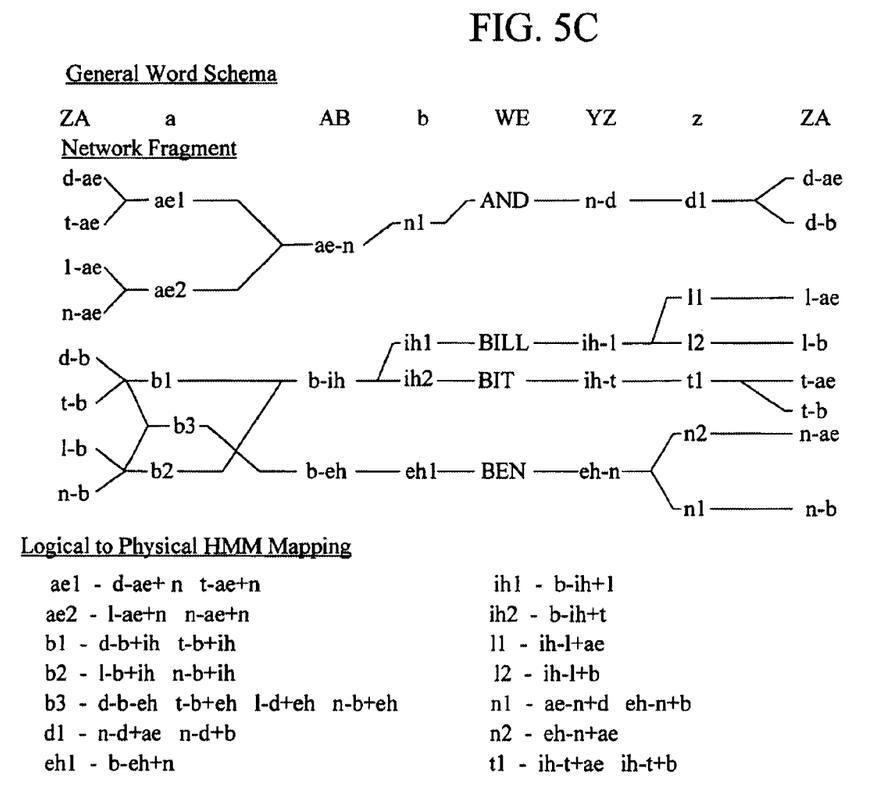

The collating null nodes are created for each context that actually occurs in the dictionary and all contextually consistent paths are joined with a shared network of HMMs. The set of YZ and AB contexts for which YZ and AB nodes are required can be found by scanning the dictionary. This scan can also be used to find the set of possible first and last phones. The product of these sets (together with "sil") defines the set of ZA contexts each requiring a ZS and an SA node. This network organisation is illustrated by FIG. 5 which shows a network fragment corresponding to the words "and", "bill", "bit" and "but".

This network is constructed in the following stages.

i) Scan the dictionary to determine the set of contexts A, Z, AB and YZ.

ii) Make all required SA, AB, YZ and ZS nodes. The required set of ZS/SA nodes is the product of the A and Z sets (together with inter-word "sil" context).

iii) Join the YZ nodes to the ZS nodes using the appropriate HMMs (y–z+a) sharing these where possible.

iv) Join each ZS node to the appropriate SA node using the appropriate silence HMM ("sil" or "sp").

v) Join the SA nodes to the AB nodes using the appropriate HMMs (z–a+b) sharing these where possible.

vi) Scan the dictionary 26 by for each many phone word, find the appropriate AB node and, using models already present in the network where possible, add a path representing the phone sequence of the word ending in a word end node linked to the appropriate YZ node; for each two phone word, add a word end node linking the appropriate AB and YZ nodes; and for each single phone word, for each possible preceding context(Z) create a word end node and link it to the appropriate SA node. Connect each of these word end nodes to the appropriate YZ nodes for all Z contexts.

Searching in the network model 20 and the efficient merging procedure used during the search will now be described.

The standard Viterbi algorithm stores a single token in each network state and updates this every frame by searching possible predecessor states and copying over the most likely. All other tokens are discarded.

In order to allow the generation of multiple hypotheses and to allow the later application of more detailed language models, the present invention is arranged so that alternative hypotheses are not discarded but a maximum, N, number of the most likely are retained.

If all likely hypotheses were retained and no simplification (or recombination) of hypotheses was allowed, the number of possibilities would grow exponentially with time. Fortunately as dependencies tend to be local rather than global, it is not necessary to separately process hypotheses which differ long into the past but share a common recent history. In other words the assignment of frames to states for a particular word may be dependent upon the immediately preceding word but is not affected by the choice of words further back in time. In practice when hypotheses share a common previous word they can be merged without degrading accuracy.

This means that rather than the select best procedure employed for token propagation in the straightforward Viterbi algorithm the following more complex merging procedure is employed when multiple hypotheses are retained.

For each state of the network: Pass a copy of the token in each possible preceding state into the current state whilst updating its likelihood with the probability of the connecting transition and updating its path with required traceback information. Often it is not necessary to update the traceback information as the exact state/frame assignment is not needed only the most likely sequence of words. In this case the traceback information is only updated when a boundary is encountered.

Once all tokens have been collected, merge any sets of tokens which share the same previous word history (as it is assumed that they will follow the same path through the network so can share a single token with the variations represented by attaching multiple histories to the single token) and finally discard all but the N most likely.

This token merging operation is complex. However, it is found in practice that often the most likely N tokens all originate at the previous time instant from the same state and when this is true the merging procedure can be efficiently performed as follows.

Assuming that each set of tokens is stored as a main token, which represents the most likely hypothesis, together with a set of relative tokens which represent the alternative hypotheses. The relative tokens hold their likelihood not as an absolute number but as a likelihood relative to the main token of the set.

| MAIN_TOKEN | likelihood | history |
| --- | --- | --- |
| REL_TOKEN1 | relative-likelihood | history |
| REL_TOKEN2 | relative-likelihood | history |
| REL_TOKEN3 | relative-likelihood | history |

When token sets are stored this way, the complex merge operation can be bypassed when merging two token sets if all of the relative tokens of one set are identical to those of the other set. In this case all that is required is for the main token likelihood to be used to determine which token set is more likely. There is no need to examine each relative token in turn, determine that its history matches a relative token in the other set and decide which is more likely. Since all the pairs of relative likelihoods are the same, all the decisions will be made on the basis of the main token likelihoods. The relative tokens get propagated together with the main token.

If each token set is assigned an identifier that changes whenever the set of relative tokens changes, the determination of this condition can be made by comparing identifiers.

A further refinement is also possible. Although the language model scores will change as the token moves through the network, all tokens with the same history will change in the same fashion. This means that the token set identifier does not need to change due to the effects of changing language model likelihoods.

Overall the above procedure can significantly reduce the time taken to propagate tokens through the network during recognition.

In order to gain maximum benefit from these improvements and minimise search complexity, it is important not to delay application of the associated language model (or any other available knowledge source). Although a single word identity is not known until the word end is reached, the set of possible words that each node of the network model 20 rep resents is known. If the network model 20 is viewed as a collapsed linear lexicon, the correct language model score for a token at a particular node is the maximum value over all words that the node represents.

In a direct implementation finding the maximum language model score for a particular node and history combination requires a number of language model probability look-ups equal to the number of words sharing the particular node (anywhere from 1 to a few thousand). Since each look-up requires significant computation, the computational cost of applying such an implementation at every point in the network is unacceptable and often the language model application would be delayed until the next word boundary.

However the invention reduces the complexity of the set of look-ups sufficient to allow continuous application of an NGram language model to become viable.

Figure 6:
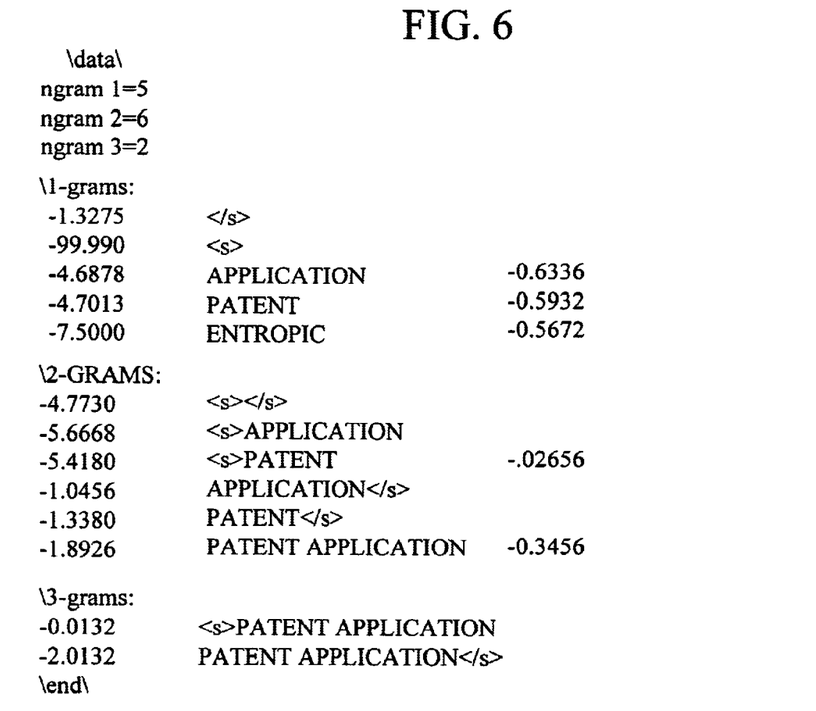
FIG. 6 is a diagram showing a fragment of an example language model.

FIG. 6 shows a typical way in which the language model may be stored. Each probability entry can be split up into the history, predicted word and a probability. When a backed-off or interpolated style of language model is used an additional weight is required for each history.

The complete language model can be efficiently stored and accessed using the following structures;

History entries: consisting of a history, a sparse array of probability entries and for some types of language model a weight.

Probability entries: consisting of a predicted word identifier and a probability.

There is a history entry for each history for which there are predicted words. The sparse array of probability entries hold the probability of the predicted word following the history. Note that the history can be any length (including empty, in which case the probabilities are unigram probabilities).

Storing all the history entries in a hash table (hashed on the history) and sorting the sparse array according to the predicted word identifier enables a particular NGram probability to be found with a hash table lookup followed by a binary search of the sparse array.

This type of structure can also be used to enable fast look-up of the maximum LM likelihood at a particular network node. The identifiers associated with each word can be assigned in such a way that each node spans a contiguous range of identifiers finding the maximum likelihood over the set of words subsumed in a node is relatively simple. Rather than requiring a search for each word in turn, a single efficient binary can locate the first word for which there is an NGram entry and then the array can be processed linearly until the last word contained in the node is passed.

Figure 7A:
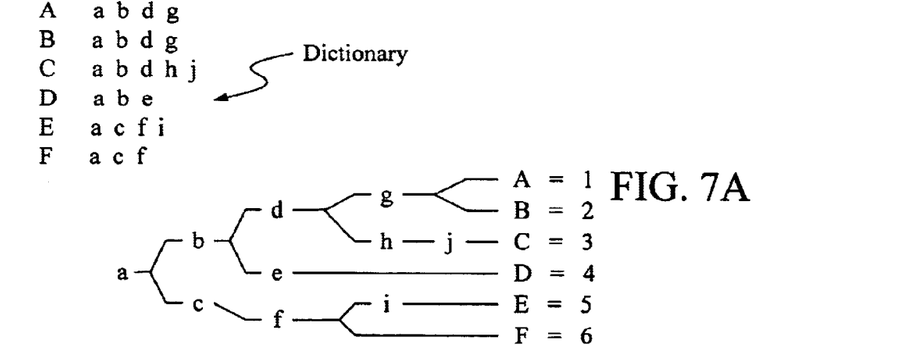
FIGS. 7 is schematic diagram showing how a language model according to the present invention can be structured and accessed.
Figure 7B:
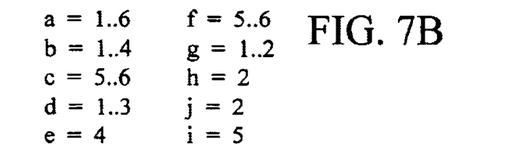

This ordering can be achieved for a left to right tree structured network by assigning predicted word identifiers according to their position in the tree (FIG. 7).

Although the whole network is not structured as a single left to right tree, each of the three parts is and so this numbering scheme can be used. However it should be noted that when a word has multiple pronunciations (ie a different phone sequence representing that word), it will have different routes through the network and thus may require different identifiers to ensure the contiguous assignment of word identifiers to nodes. This means that where previously the predicted word identifiers could be assigned one per word (or word class) they may now need to be different for different pronunciations. This increase in the size of the language model is usually small for word based language models, however, as most language model classes—i.e. words—only have one pronunciation.

Overall the above procedure reduces the cost of finding the maximum LM probability at each node by a factor equal to the cost of the binary search (approximately O(log2(n)) where n is the number of probability entries in the particular history entry. In practice this is usually a factor in the range of 20–100.

What is claimed is:

1. A language model structure for use in a speech recognition system employing a tree-structured network model, the language model comprising identifiers with associated language model probabilities, the language model being structured such that identifiers associated with each word and contained therein are arranged such that each node of the network model with which the language model is associated spans a continuous range of identifiers and associated language model probabilities in the language model structure.

2. A speech recognition system including a language model according to claim 1.

3. A tree-structured network for use in a speech recognition system, the tree-structured network comprising:
   a first tree-structured section representing the first phone of each word having two or more phones;
   a second tree-structured section representing within word phones, wherein within word phones includes any phone between the first phone and the last phone of a word;
   a third tree-structured section representing the last or only phone of each word;
   a fourth tree-structured section representing inter-word silences; and,
   a number of null nodes for joining each tree-structured section to the following tree-structured section.

4. A speech recognition system including a tree-structured network according to claim 3.

5. A method of transferring tokens through a tree-structured network in a speech recognition process, each token including a likelihood which indicates the probability of a respective path through the network representing a respective word to be recognised, and wherein each token further includes a history of previously recognised words, the method comprising the steps of:
   i) combining tokens at each state of the network to form a set of tokens, the set including a main token having the highest likelihood and one or more relative tokens;
   ii) converting the likelihood of each relative token into a relative likelihood that is set relative to the likelihood of the main token;
   iii) for each set of tokens, merging tokens having the same history;
   iv) transferring the set of tokens to subsequent nodes in the network;
   v) updating the likelihood of at least the main token of each set of tokens; and
   vi) repeating steps i) to v) at each respective node.

6. The method according to claim 5, wherein the step of merging tokens comprises:
   i) assigning an identifier to each set of tokens, the identifier representing the word histories of each of the tokens in the set of tokens;
   ii) comparing the identifiers of different sets of tokens; and
   iii) merging sets of tokens having the same identifiers.

7. A speech recognition system having a network of nodes comprising:
   a set of first-phone nodes representing the first phones of words;

a tree-structured section representing within word phones, wherein within word phones includes any phone between the first phone and the last phone of a word; and a number of null nodes for joining the set of first-phone nodes to the tree-structured section.

8. The speech recognition system of claim 7 wherein the network of nodes further comprises:

a set of last-phone nodes representing the last phones words; and additional null nodes for connecting the tree-section to the set of last-phone nodes.

9. The speech recognition system of claim 8 wherein the network of nodes further comprises:

a set of inter-word silence nodes; and a set of null nodes for connecting nodes in the set of last-phone nodes to the inter-word silence nodes.

10. The speech recognition system of claim 9 wherein the network of nodes further comprises:

a set of null nodes for connecting the inter-word silence nodes to the nodes in the set of first-phone nodes.

11. The speech recognition system of claim 7 wherein each first-phone node represents a tri-phone.

* * * * *

UNITED STATES PATENT AND TRADEMARK OFFICE
CERTIFICATE OF CORRECTION

PATENT NO. : 6,668,243 B1
DATED : December 23, 2003
INVENTOR(S) : Odell

It is certified that error appears in the above-identified patent and that said Letters Patent is hereby corrected as shown below:

Column 1,
Line 14, "EHM" should be -- HMM --

Column 4,
Line 48, "stored" should be -- store --

Column 5,
Line 55, "p-g+r" should be -- p-q+r --

Column 6,
Line 36, "HMMS" should be -- HMMs --

Column 8,
Line 62, "rep resents" should be -- represents --

Signed and Sealed this

First Day of June, 2004

JON W. DUDAS
*Acting Director of the United States Patent and Trademark Office*